United States Patent
Magazinik et al.

(10) Patent No.: US 10,846,633 B2
(45) Date of Patent: Nov. 24, 2020

(54) SYSTEM FOR SELECTING DRIVERS FOR TRANSPORTATION REQUESTS WITH SPECIFIED TIME DURATIONS

(71) Applicant: Lyft, Inc., San Francisco, CA (US)

(72) Inventors: Igor Magazinik, Ramat Gan (IL); Ofer Samocha, Rishion le-Zion (IL)

(73) Assignee: LYFT, INC., San Francisco, CA (US)

( * ) Notice: Subject to any disclaimer, the term of this patent is extended or adjusted under 35 U.S.C. 154(b) by 474 days.

(21) Appl. No.: 14/982,825

(22) Filed: Dec. 29, 2015

(65) Prior Publication Data

US 2017/0185948 A1   Jun. 29, 2017

(51) Int. Cl.
  *G06Q 10/06* (2012.01)
  *G06Q 50/32* (2012.01)
  *G06Q 10/02* (2012.01)
  *G01C 21/34* (2006.01)

(52) U.S. Cl.
  CPC ..... *G06Q 10/063118* (2013.01); *G06Q 50/32* (2013.01); *G01C 21/343* (2013.01); *G01C 21/3438* (2013.01); *G06Q 10/02* (2013.01)

(58) Field of Classification Search
  CPC .... G06Q 50/30; G06Q 50/10; G06Q 30/0205; G06Q 30/0283
  See application file for complete search history.

(56) References Cited

U.S. PATENT DOCUMENTS

| | | | |
|---|---|---|---|
| 9,679,489 B2 * | 6/2017 | Lambert | G08G 1/202 |
| 9,904,900 B2 * | 2/2018 | Cao | G06Q 50/30 |
| 2005/0021227 A1 * | 1/2005 | Matsumoto | G01C 21/3415 |
| | | | 701/431 |
| 2006/0059023 A1 * | 3/2006 | Mashinsky | G06Q 10/02 |
| | | | 705/5 |
| 2014/0288832 A1 * | 9/2014 | Hoch | G01C 21/3469 |
| | | | 701/538 |
| 2015/0161564 A1 * | 6/2015 | Sweeney | G06Q 10/063114 |
| | | | 705/338 |
| 2015/0206437 A1 * | 7/2015 | Fowler | G01C 21/34 |
| | | | 701/410 |
| 2015/0242944 A1 * | 8/2015 | Willard | G06Q 30/0645 |
| | | | 705/5 |
| 2015/0323330 A1 * | 11/2015 | Lord | G06Q 10/025 |
| | | | 701/410 |
| 2015/0323331 A1 * | 11/2015 | Lord | G01C 21/3423 |
| | | | 701/410 |

(Continued)

OTHER PUBLICATIONS

ShowcaseLimo, Feb. 22, 2015, http://showcaselimo.com/Reservations.htnnl, p. 1 (Year: 2015).*

(Continued)

*Primary Examiner* — George Chen
*Assistant Examiner* — Ismail A Manejwala
(74) *Attorney, Agent, or Firm* — Keller Jolley Preece

(57) ABSTRACT

In one embodiment a request from a computing device of a passenger for a driver for a specified duration of time is received at a server comprising at least one processor. The request may include a start time and a pickup location. A first driver may be selected from a plurality of drivers to pick up the passenger. The selection of the first driver may be based on the start time and the pickup location specified in the request. Navigational data may be transmitted to the first driver to enable the first driver to pick up the passenger.

20 Claims, 4 Drawing Sheets

(56) References Cited

U.S. PATENT DOCUMENTS

| | | | |
|---|---|---|---|
| 2015/0323335 A1* | 11/2015 | Lord | G01C 21/343 |
| | | | 705/7.15 |
| 2016/0027306 A1* | 1/2016 | Lambert | G08G 1/123 |
| | | | 701/117 |
| 2016/0300178 A1* | 10/2016 | Perry | G06Q 10/063112 |
| 2016/0364678 A1* | 12/2016 | Cao | G06Q 50/30 |
| 2017/0011324 A1* | 1/2017 | Truong | G06Q 10/063112 |
| 2017/0072851 A1* | 3/2017 | Shenoy | G08G 1/096775 |
| 2017/0169366 A1* | 6/2017 | Klein | G06Q 10/025 |
| 2017/0206475 A1* | 7/2017 | Shoen | G06Q 30/0645 |

OTHER PUBLICATIONS

SafeRides, Jun. 12, 2015, http://saferides.org/quote.aspx, p. 1 (Year: 2015).*

Kanika Bathla, Real-Time Distributed Taxi Ride Sharing, 2018, IEEE (Year: 2018).*

\* cited by examiner

SYSTEM FOR SELECTING DRIVERS FOR TRANSPORTATION REQUESTS WITH SPECIFIED TIME DURATIONS

TECHNICAL FIELD

This disclosure relates in general to the field of mobile applications and, more particularly, to a system for selecting drivers for transportation requests with specified time durations.

BACKGROUND

A transportation service may utilize a plurality of drivers that fulfill passenger requests for transportation. A transportation service may provide one or more mobile applications that facilitate the efficient pairing of passengers and drivers. The transportation service may receive a transportation request and select a driver to fulfill the request based on information associated with the transportation request and information associated with the driver.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In one embodiment a request from a computing device of a passenger for a driver for a specified duration of time is received at a server comprising at least one processor. The request may include a start time and a pickup location. A first driver may be selected from a plurality of drivers to pick up the passenger. The selection of the first driver may be based on the start time and the pickup location specified in the request. Navigational data may be transmitted to the first driver to enable the first driver to pick up the passenger.

Example Embodiments

Figure 1:
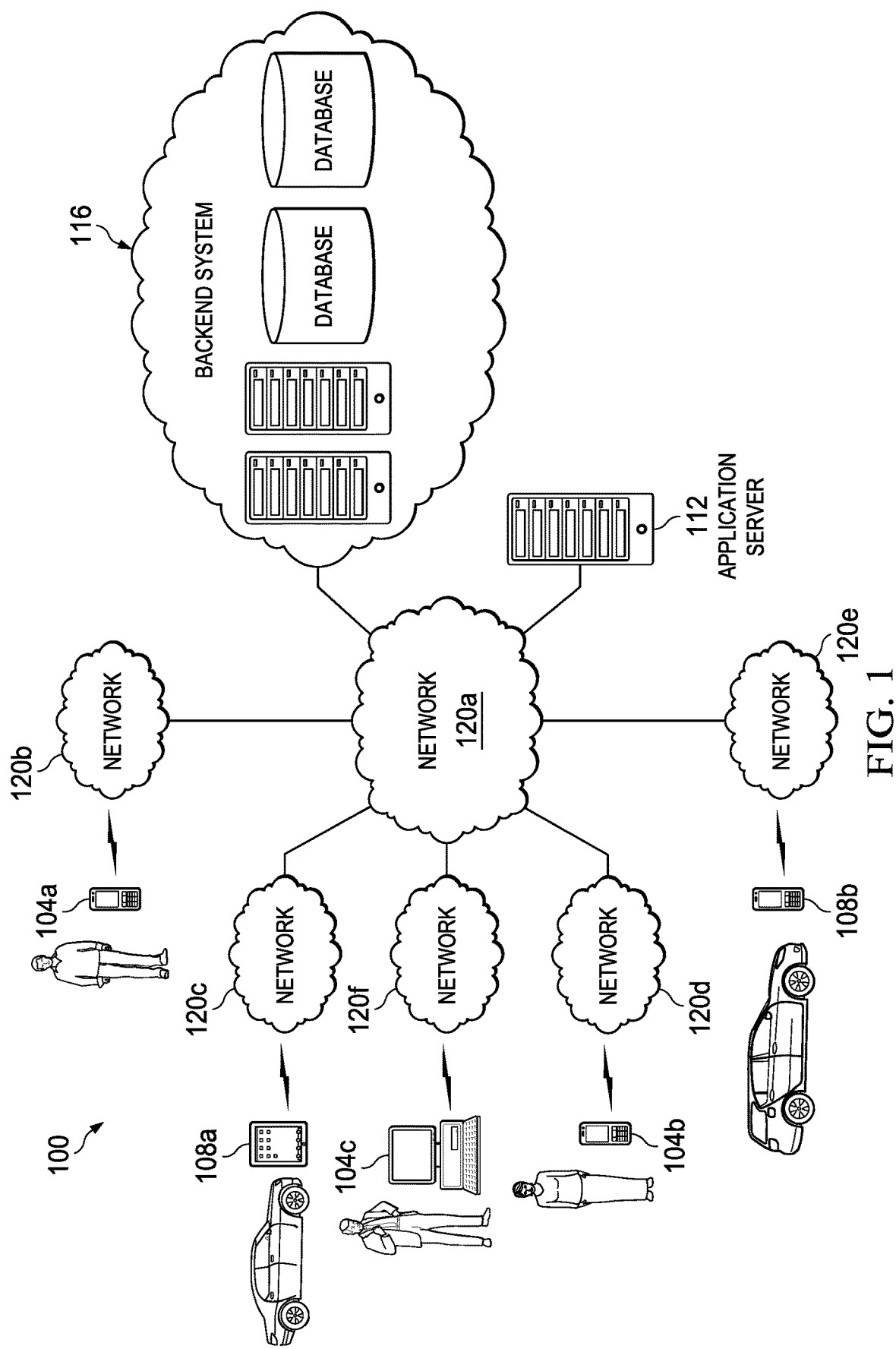
FIG. 1 illustrates a block diagram of a system for selecting drivers for transportation requests with specified time durations in accordance with certain embodiments.

FIG. 1 illustrates a block diagram of a system 100 for selecting drivers for transportation requests with specified time durations in accordance with certain embodiments. Although various embodiments may include any number of drivers, passengers, and associated devices, system 100 depicts three passengers having associated passenger computing devices 104 and two drivers having associated driver computing devices 108. The computing devices are coupled through various networks 120 to an application server 112 and a backend system 116.

Various embodiments of the present disclosure may enhance the experience of passengers and drivers associated with a transportation service by selecting appropriate drivers for transportation requests with specified time durations. Particular embodiments may provide passengers the option of reserving a driver for a specified amount of time. For example, a passenger may reserve a driver for sightseeing in a visited city or for work-related transportation. Particular embodiments may also provide for seamless handover of the passenger from a first driver to a second driver when the first driver is unable to complete the duration of the transportation request. Various embodiments may provide technical advantages such as minimizing fuel or power used to service transportation requests, minimizing communication between a transportation service and its drivers to fulfill transportation requests, and quick arrangement and communication to a passenger of details associated with a transportation request.

Computing devices 104 and 108 may include any electronic computing device operable to receive, transmit, process, and store any appropriate data. In various embodiments, computing devices 104 and 108 may be mobile devices or stationary devices. As examples, mobile devices may include laptop computers, tablet computers, smartphones, personal digital assistants, smartwatches, computers integrated with a vehicle, computers integrated with clothing, and other devices capable of connecting (e.g., wirelessly) to one or more networks 120 while stationary devices may include desktop computers, televisions, or other devices that are not easily portable. Devices 104 and 108 may include a set of programs such as operating systems (e.g., Microsoft Windows, Linux, Android, Mac OSX, Apple iOS, UNIX, or similar operating system), applications, plug-ins, applets, virtual machines, machine images, drivers, executable files, and other software-based programs capable of being run, executed, or otherwise used by the respective devices. Each computing device can include at least one graphical display and user interface allowing a user to view and interact with applications and other programs of the computing device. In a particular embodiment, computing device 108 may be a hardened device that is configured to only run a driver application using a specialized operating system (e.g., a modified version of Android). In one embodiment, a transportation service may issue or otherwise facilitate the provision of hardened devices to its drivers, but restrict the functionality of the devices to the driver application (i.e., the devices may be locked down so as not to allow the installation of additional applications or may only allow preapproved applications to be installed).

In various embodiments, a driver computing device 108 may be integrated within and/or communicate with a self-driven vehicle (e.g., a vehicle that has the capability of driving without physical steering guidance from a human being) and may influence the movement of the vehicle by providing route information (e.g., passenger pick-up and destination locations driver destination locations, navigational directions, etc.) to the self-driven vehicle. Accordingly, as used herein "driver" may refer to a human being that may physically drive or otherwise control movement of a vehicle or to the vehicle itself (e.g., in the case of a self-driven vehicle) or component thereof (e.g., computing device application 108 or logic thereof).

In particular embodiments, a passenger application runs on passenger computing devices 104. The application may allow a user to enter various account information (e.g., in connection with a registration with the transportation service) to be utilized by a transportation service. For example, the account information may include a user name and password (or other login credentials), contact information of the user (e.g., phone number, home address), payment information (e.g., credit card numbers or bank account numbers and associated information), or car preference information (e.g., what models or color of car the user prefers).

The application may allow a user to request a ride from the transportation service. In various embodiments, the application may establish a pick-up location automatically or based on user input (e.g., locations may include the current location of the computing device 104 as determined by a global positioning system (GPS) of the computing device or a different user-specified location). In certain embodiments, the user may specify a destination location as well. The locations may be specified in any suitable format, such as GPS coordinates, street address, establishment name (e.g., LaGuardia Airport, Central Park, etc.), or other suitable format. At any time (e.g., before the ride, during the ride, or after the ride is complete) the user may specify a method of payment to be used for the ride. The user may also specify whether the request is for immediate pick-up or for a specified time in the future. In various embodiments, the user may specify pick-up by a vehicle that has particular merchandise available for use by the user, such as a specified type of battery charger, bottle of water or other food or beverage, umbrella, or other suitable merchandise. The user may also specify criteria for the driver, such as a minimum performance rating, such that drivers having performance ratings below the minimum performance rating will not be considered during selection of the driver.

The user may use the application to order a ride based on the specified information. The request for the ride is generated based on the information and transmitted to backend system 116. Backend system 116 will facilitate the selection of a driver. In some embodiments, backend system 116 may select a driver based on any suitable factors, such as the information contained in the request from the passenger, the proximity of the driver to the passenger, or other suitable factors. In other embodiments, backend system 116 may select a plurality of drivers that could fulfill the ride request, send information associated with the drivers to the passenger, and allow the passenger to select the driver to be used via the application on the passenger computing device 104. Any suitable information about the potential driver(s) may be sent to the computing device 104 either before or after the selection of the driver by the passenger, such as a location of a driver, an estimated pick-up time, a type of car used by a driver, the merchandise available in the car, driver ratings or comments from other passengers about the driver, or other suitable information.

Once a driver has been selected and has accepted the request to provide a ride, the application may notify the user of the selected driver and provide real-time updates of the driver's location (e.g., with respect to the passenger's location) and estimated pick-up time. The application may also provide contact information for the driver and/or the ability to contact the driver through the application (e.g., via a phone call or text). Once the ride has begun, the application may display any suitable information, such as the current location of the computing device 104 and the route to be taken. Upon completion of the ride, the application may provide the passenger the ability to rate the driver or provide comments about the driver.

In particular embodiments, a driver application runs on driver computing devices 108. The application may allow a driver to enter various account information to be utilized by a transportation service. For example, the account information may include a user name and password (or other login credentials), contact information of the driver (e.g., phone number, home address), information used to collect payment (e.g., bank account information), vehicle information (e.g., what model or color of car the driver utilizes), merchandise offered by the driver, or other suitable information.

In various embodiments, the application may allow a driver to specify his availability to transport passengers for the transportation service. In some embodiments, the driver may select between multiple levels of availability. In one example, the driver may be "available," meaning that the driver is willing to receive and consider any transportation requests that the transportation service sends the driver; the driver may be "unavailable," meaning that the driver is not willing to receive any transportation requests (e.g., this state may be explicitly indicated by the driver inputting this state into his computing device or may be detected through a deduction that the driver's device is not logged in to the transportation service through the driver application), or the driver may be "inactive," meaning that the driver only desires to receive particular requests meeting certain exception criteria.

The application may periodically transmit the current location of the computing device 108 as determined by a GPS of the computing device 108 to the backend system 116. When a driver is selected to provide (or identified as a suitable candidate for) a ride, backend system 116 may send a notification to the driver application. In some embodiments, the driver may have a limited amount of time to select whether the driver accepts the ride. In other embodiments, the application may be configured by the driver to automatically accept the ride or to automatically accept the ride if certain criteria are met (e.g., fare minimum, direction of travel, minimum passenger rating, etc.).

Once a pairing of the driver and the passenger is confirmed by backend system 116, the application may navigate the driver to the passenger. The application may also provide contact information for the passenger and/or the ability to contact the passenger through the application (e.g., via a phone call, email, instant message, or text). The application may also navigate the driver to the passenger's destination once the ride begins. Upon completion of the ride, the application may provide the driver the ability to rate the passenger or provide comments about the passenger.

System 100 may include one or more application servers 112 coupled to the computing devices through one or more networks 120. The passenger application and driver application may be supported with, downloaded from, served by, or otherwise provided through an application server 112 or other suitable means. In some instances, the applications can be downloaded from an application storefront onto a particular computing device using storefronts such as Google Android Market, Apple App Store, Palm Software Store and App Catalog, RIM App World, etc., or other sources. In various embodiments, the passenger application and driver application may be installed on their respective devices in any suitable manner and at any suitable time. As one example, a passenger application may be installed on a computing device as part of a suite of applications that are pre-installed prior to provision of the computing device to a consumer. As another example, a driver application may be installed on a computing device by a transportation service (or an entity that provisions computing devices for the transportation service) prior to the issuance of the device to a driver that is employed or otherwise associated with the transportation service.

As described above, applications utilized by computing devices 104 and 108 can make use of a backend system 116. Backend system 116 may comprise any suitable servers or other computing devices that facilitate the provision of a transportation service as described herein. For example, backend system 116 may receive a request from a passenger and facilitate the assignment of a driver to fulfill the request. Backend system 116 is described in more detail in connection with FIG. 3.

In general, servers and other computing devices of backend system 116 or application server 112 may include electronic computing devices operable to receive, transmit, process, store, or manage data and information associated with system 100. As used in this document, the term "computing device," is intended to encompass any suitable processing device. For example, portions of backend system 116 or application server 112 may be implemented using computers other than servers, including server pools. Further, any, all, or some of the computing devices may be adapted to execute any operating system, including Linux, UNIX, Windows Server, etc., as well as virtual machines adapted to virtualize execution of a particular operating system, including customized and proprietary operating systems.

Further, servers and other computing devices of system 100 can each include one or more processors, computer-readable memory, and one or more interfaces, among other features and hardware. Servers can include any suitable software component or module, or computing device(s) capable of hosting and/or serving a software application or services (e.g., services of application server 112 or backend system 116), including distributed, enterprise, or cloud-based software applications, data, and services. For instance, servers can be configured to host, serve, or otherwise manage data sets, or applications interfacing, coordinating with, or dependent on or used by other services, including transportation service applications and software tools. In some instances, a server, system, subsystem, or computing device can be implemented as some combination of devices that can be hosted on a common computing system, server, server pool, or cloud computing environment and share computing resources, including shared memory, processors, and interfaces.

In various embodiments, backend system 116 or any components thereof may be deployed using a cloud service such as Amazon Web Services, Microsoft Azure, or Google Cloud Platform. For example, the functionality of the backend system 116 may be provided by virtual machine servers that are deployed for the purpose of providing such functionality or may be provided by a service that runs on an existing platform.

System 100 also includes various networks 120 used to communicate data between the computing devices 104 and 108, the backend system 116, and the application server 112. The networks 120 described herein may be any suitable network or combination of one or more networks operating using one or more suitable networking protocols. A network may represent a series of points, nodes, or network elements and interconnected communication paths for receiving and transmitting packets of information. For example, a network may include one or more routers, switches, firewalls, security appliances, antivirus servers, or other useful network elements. A network may provide a communicative interface between sources and/or hosts, and may comprise any public or private network, such as a local area network (LAN), wireless local area network (WLAN), metropolitan area network (MAN), Intranet, Extranet, Internet, wide area network (WAN), virtual private network (VPN), cellular network (implementing GSM, CDMA, 3G, 4G, LTE, etc.), or any other appropriate architecture or system that facilitates communications in a network environment depending on the network topology. A network can comprise any number of hardware or software elements coupled to (and in communication with) each other through a communications medium. In some embodiments, a network may simply comprise a transmission medium such as a cable (e.g., an Ethernet cable), air, or other transmission medium.

Figure 2:
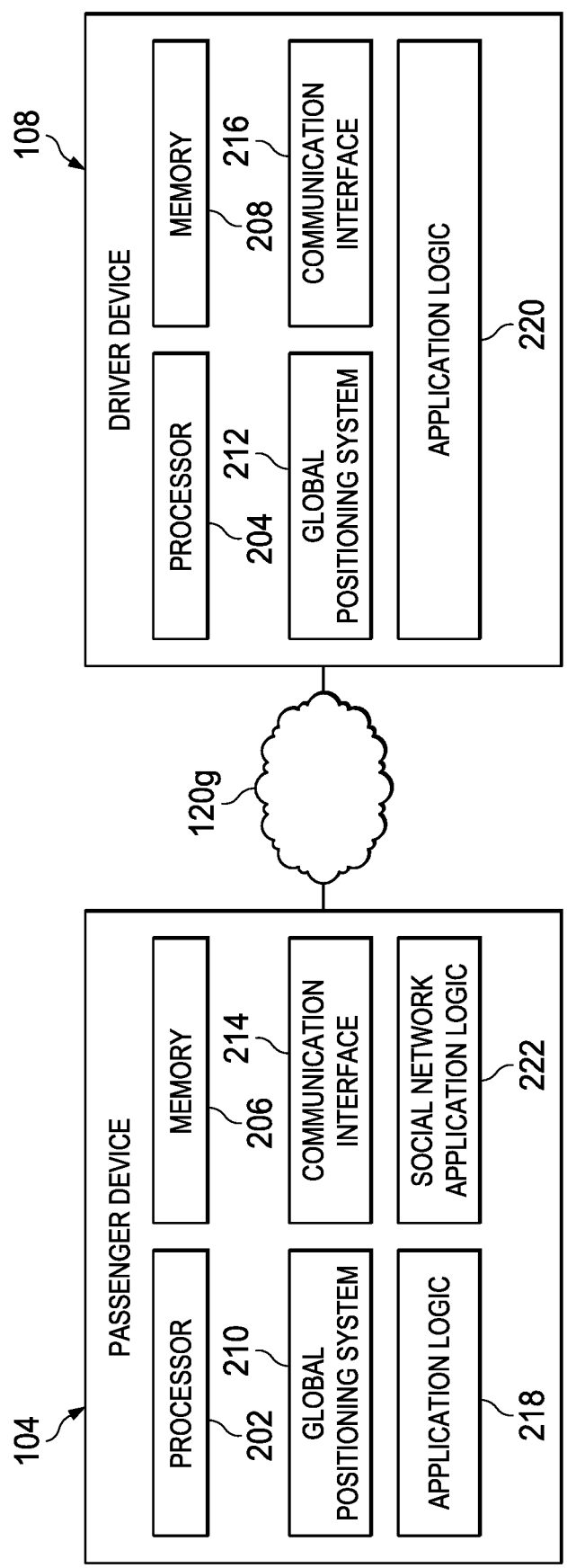
FIG. 2 illustrates a block diagram of a passenger computing device and a driver computing device of the system of FIG. 1 in accordance with certain embodiments.

FIG. 2 illustrates a block diagram of a passenger computing device 104 and a driver computing device 108 of the system of FIG. 1 in accordance with certain embodiments. Herein, "passenger computing device" may be used to refer to a computing device used by a subscriber that has registered an account with the transportation service or other user who interacts with the transportation service (e.g., by communicating with the transportation service to request transportation) while "driver computing device" may be used to refer to a computing device used by a driver of the transportation service. A subscriber may refer to an individual or entity that has provided account data (e.g., user name, password, payment information, telephone number, home address, other account information, or any suitable combination thereof) to backend system 116 for storage by the backend system 116. In the embodiment shown, the devices may be communicatively coupled through network 120g which may include any suitable intermediary nodes, such as a backend system 116.

In the embodiment depicted, computing devices 104 and 108 each include a computer system to facilitate performance of their respective operations. In particular embodiments, a computer system may include a processor, storage, and one or more communication interfaces, among other components. As an example, computing devices 104 and 108 each include one or more processors 202 and 204, memory elements 206 and 208, and communication interfaces 214 and 216, among other hardware and software. These components may work together in order to provide functionality described herein.

A processors 202 or 204 may be a microprocessor, controller, or any other suitable computing device, resource, or combination of hardware, stored software and/or encoded logic operable to provide, either alone or in conjunction with other components of computing devices 104 and 108, the functionality of these computing devices. In particular embodiments, computing devices 104 and 108 may utilize multiple processors to perform the functions described herein.

A processor can execute any type of instructions to achieve the operations detailed in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an application specific integrated circuit (ASIC) that includes digital logic, software, code, electronic instructions, or any suitable combination thereof.

Memory 206 and 208 may comprise any form of non-volatile or volatile memory including, without limitation, random access memory (RAM), read-only memory (ROM), magnetic media (e.g., one or more disk or tape drives), optical media, solid state memory (e.g., flash memory), removable media, or any other suitable local or remote memory component or components. Memory 206 and 208 may store any suitable data or information utilized by computing devices 104 and 108, including software embedded in a computer readable medium, and/or encoded logic incorporated in hardware or otherwise stored (e.g., firmware). Memory 206 and 208 may also store the results and/or intermediate results of the various calculations and determinations performed by processors 202 and 204.

Communication interfaces 214 and 216 may be used for the communication of signaling and/or data between computing devices 104 and 108 and one or more networks (e.g., 120g) and/or network nodes (e.g., backend system 116 and application server 112) coupled to a network or other communication channel. For example, communication interfaces 214 and 216 may be used to send and receive network traffic such as data packets. Each communication interface 214 and 216 may send and receive data and/or signals according to a distinct standard such as an LTE, IEEE 802.11, IEEE 802.3, or other suitable standard. In various embodiments, any of the data described herein as being communicated between elements of system 100 may be data generated using voice commands from a user or data generated independently of voice commands (e.g., data may be generated by a processor in response to the processor receiving data from another element or from an input device such as a touch screen). Communication interfaces 214 and 216 may include antennae and other hardware for transmitting and receiving radio signals to and from other devices in connection with a wireless communication session over one or more networks 120.

GPS units 210 and 212 may include any suitable hardware and/or software for detecting a location of their respective computing devices 104 and 108. For example, a GPS unit may comprise a system that receives information from GPS satellites, wireless or cellular base stations, and/or other suitable source and calculates a location based on this information (or receives a calculated position from a remote source). In one embodiment, the GPS unit is embodied in a GPS chip.

Application logic 218 may include logic providing, at least in part, the functionality of the passenger application described herein. Similarly, application logic 220 may include logic providing, at least in part, the functionality of the driver application described herein. In a particular embodiment, the logic of devices 104 and 108 may include software that is executed by processor 202 and 204. However, "logic" as used herein, may include but not be limited to hardware, firmware, software and/or combinations of each to perform a function(s) or an action(s), and/or to cause a function or action from another logic, method, and/or system. In various embodiments, logic may include a software controlled microprocessor, discrete logic (e.g., an application specific integrated circuit (ASIC)), a programmed logic device (e.g., a field programmable gate array (FPGA)), a memory device containing instructions, combinations of logic devices, or the like. Logic may include one or more gates, combinations of gates, or other circuit components. Logic may also be fully embodied as software.

In various embodiments of the present disclosure, in addition to any combination of the features described above with respect to the passenger application, application logic 218 may provide additional features for the passenger application to enhance a passenger's experience.

In various embodiments, application logic 218 may provide an interface allowing a passenger to generate a transportation request for a duration of time. The transportation request may be sent by logic 218 to backend system 116. The transportation request may include any suitable combination of the information described herein in connection with a standard transportation request that specifies a destination location rather than a time duration (e.g., driver/vehicle preferences, requested merchandise, etc.). In the request, a passenger may specify a duration of time by explicitly specifying a length of time of the request (the user may also specify a start time) or by indicating a start time and end time of the request (from which the duration may be inferred). In various embodiments, the passenger may specify a duration of time by specifying a plurality of destination locations and an expected wait time at one or more of the destination locations (e.g., a length of time that the driver will wait at each destination location while the passenger attends to sightseeing, business, or other matters) and backend system 116 may calculate the expected duration of the request utilizing any suitable information (such as expected transit times to the destination locations).

The request may also specify a start location where the first driver servicing the transportation request is to pick up the passenger (e.g., the current location of the passenger's computing device 104 or a different location). In particular embodiments, the request may specify a final destination location where the passenger is to be dropped off when the transportation request has been completed. Optionally, the request may omit the final destination location and the final destination location may be provided at a later time (e.g., during the fulfillment of the transportation request).

When the transportation request is generated, backend system 116 and/or application logic 218 may determine a cost to fulfill the transportation request or other terms associated with the request (e.g., one or more parameters submitted by the passenger may be modified by the backend system 116 if the submitted parameters cannot be fulfilled) and present the cost and terms to the passenger. If the passenger agrees to the cost and terms, the transportation request (or an indication that the passenger agrees with the cost and terms) is sent to backend system 116. Subsequently, the application logic 218 (or other logic of passenger computing device 104, such as an email client) may receive confirmation from backend system 116 indicating that the transportation request will be fulfilled. Additionally, any suitable details about the transportation request may be received from the backend system 116, such as identification of one or more drivers that will fulfill the transportation request, identification of one or more vehicles that will be used to fulfill the transportation request, whether a driver has extended availability or another driver would be available (e.g., if the passenger desires to extend the duration of the request), or any other suitable information associated with the request (such as any suitable combination of the information described herein as being communicated to a passenger in connection with a standard transportation request that specifies a destination location rather than a time duration).

At any suitable time, the passenger may change (increase or decrease) the time duration of the transportation request. For example, the passenger may change the time duration before the passenger at any time before the passenger is picked up or even after being picked up (while the transportation request is being fulfilled). As one example, during the ride the passenger may realize that more time is needed and may utilize application logic 218 to request additional time by specifying an amount of time to add to the current request. Alternatively, the passenger might specify one or more additional destination locations (and wait times) and the backend system 116 may estimate the amount of additional time. The request for additional time may be sent by application logic 218 to backend system 116. Backend system 116 may respond with a confirmation that the time duration of the request has been changed. In particular embodiments, backend system 116 may first communicate a price for the additional time to the passenger and receive authorization before booking the additional time and sending a confirmation to the passenger.

In some situations, a single driver may be unable to fulfill the entirety of the transportation request. In such situations, a handoff may occur in which a second driver replaces a first driver. Any suitable number of handoffs may occur during the fulfillment of a transportation request. Backend server may notify the passenger of handoffs that are to occur during fulfillment of a transportation request. Notification of the handoff may include any suitable information, such as the time the handoff will occur, where the handoff will occur, details regarding the new driver, details regarding the new vehicle, contact information of the new driver, or other suitable information that may be conveyed regarding the driver.

In a particular embodiment, a user may supply login credentials for a social network system (e.g., FACEBOOK) or other social media system (e.g., TWITTER) to the transportation service through application logic 218. The transportation service (e.g., through backend server) may then access the user's account on the social network system or other social media system and access information associated with the user's account. As another example, passenger application logic 218 may access the user's social media account directly and integrate information from the account with other functionality of the passenger application logic.

Social network application logic 222 may provide a user interface to allow a passenger to interact with (e.g., enter and transmit information to and view information received from) a social network system. A social network system may store a record (i.e., a user profile) for each user of the system. The user profile may include any suitable information about the user, such as contact information, employment information, demographic information, personal interests, user-generated content, or other suitable information. The social network system may also store a record of the user's relationship with other users of the social network system. For example, such information may be stored as a social graph, wherein users (e.g., individuals, groups, business entities, organizations, etc.) may be represented as nodes in the graph and the nodes may be connected based on relationships between the users. A social network system may provide various services (e.g., photo sharing, wall posts, messaging, games, or advertisements) facilitating interaction between the users.

In various embodiments, the social network system may interact with passenger application logic 218 or backend system 116 to enhance the functionality of these components. As an example, background information associated with a passenger may be obtained by a backend system 116 and used to determine whether to route a request from the passenger to a particular driver.

In various embodiments, the social network system may provide any of the functionality listed above with respect to passenger application logic 218 in allowing a user to request a ride and may relay received requests for rides to backend system 116 along with any suitable identifying information about the user to facilitate pickup by a driver.

In various embodiments of the present disclosure, in addition to any combination of the features described above with respect to the driver application, driver application logic 220 may provide additional features for the driver application to enhance the functionality of the transportation service.

In particular embodiment's driver application logic 220 may enable a driver to fulfill at least a portion of a transportation request specifying a time duration. For example, driver application logic 220 may communicate information about the driver to backend system 116 to aid the backend system in selecting a driver for such a request. The information communicated to backend system 116 may be explicitly entered by the driver or may be automatically collected (e.g., GPS measurements). In various embodiments, driver application logic 220 may allow the driver to indicate whether or not he is willing to drive passengers with requests having a specified time duration. As another example, the driver may indicate a preference level (e.g., strongly prefer, slightly prefer, neutral, slightly dislike, strongly dislike, etc.) towards such requests.

In various embodiments, driver application logic 220 may allow the driver to enter an availability status, such as available, not available, or inactive, as described above. In various embodiments, driver application logic 220 may also allow the driver to enter information associated with an inactive status, such as a duration of the status, a start time of the status, or exception criteria and may transmit the status indication and any associated information to the backend system 116. The duration of the status may be indicated in any suitable manner. For example, the driver may specify a time (e.g., a finite time duration or an end time) indicating when the inactive status should end and the driver's status should return to available. Driver application logic 220 may also provide an interface for allowing the driver to specify exception criteria associated with his inactive status. When a driver enters an inactive status, the backend system 116 will withhold sending transportation requests to the driver unless the specified exception criteria is met. The driver may enter any suitable criteria and may specify which conditions and how many conditions must be met before a transportation request is sent to the driver in any suitable manner. Any suitable criteria may be specified by the driver. In one example, a criterion may be that a minimum cost (e.g., actual or expected cost) for the transportation request (or the portion of the transportation request that the driver will be servicing) must be met or exceeded. In another example, a criterion may be that a minimum average cost (e.g., actual or expected cost per unit of time) for the transportation request must be met or exceeded. In some embodiments this cost may be averaged over the time duration of the transportation request itself (or the portion of the transportation request that the driver will be servicing) or may also be averaged over additional travel time to and/or from the ride for the driver. In another example, a criterion may include a time length to be compared against an expected duration of the ride (which again may or may not also include travel to and/or from the pickup or destination location of the ride). For example, the driver may only want rides shorter than the specified time length or longer than the specified time length.

Driver application logic 220 may allow the driver to specify other information that may be used by backend system 116 to select drivers for transportation requests specifying time durations. For example, the driver may specify a shift start time, a shift end time, a lunch or other break, a preferred work area, or one or more appointments of the driver (which may be entered through driver application logic 220 or through a calendar application accessible by driver application logic 220) which may optionally include specifications of locations associated with the appointments.

Driver application logic 220 may also provide various notifications to a driver. For example, driver application logic 220 may receive and display a notification from backend system 116 that the driver has been selected for a transportation request specifying a time duration. The notification may specify whether the driver has been selected to provide the initial pickup of the passenger or to participate in a passenger handoff from another driver. As another example, driver application logic 220 of a driver servicing a transportation request may receive and display a notification from backend system 116 that the passenger has changed the duration of the transportation request. In some embodiments, if the duration has been increased, the driver may respond as to whether the driver agrees to service the remainder of the request (if not a handover driver may be procured). In the event of a handoff, the driver may be provided with any suitable information to facilitate the handoff, such as where the handoff is to occur, what time the handoff is to occur, identification information of the other driver or vehicle, contact information of the other driver, or other suitable information.

Driver application logic 220 may also present received navigational information to the driver to facilitate the fulfillment of transportation requests. For example, driver application logic 220 may receive navigational information from backend system 116 and navigate the driver to a pickup location, to a handoff location, to a destination location specified by the passenger, or other suitable locations.

Figure 3:
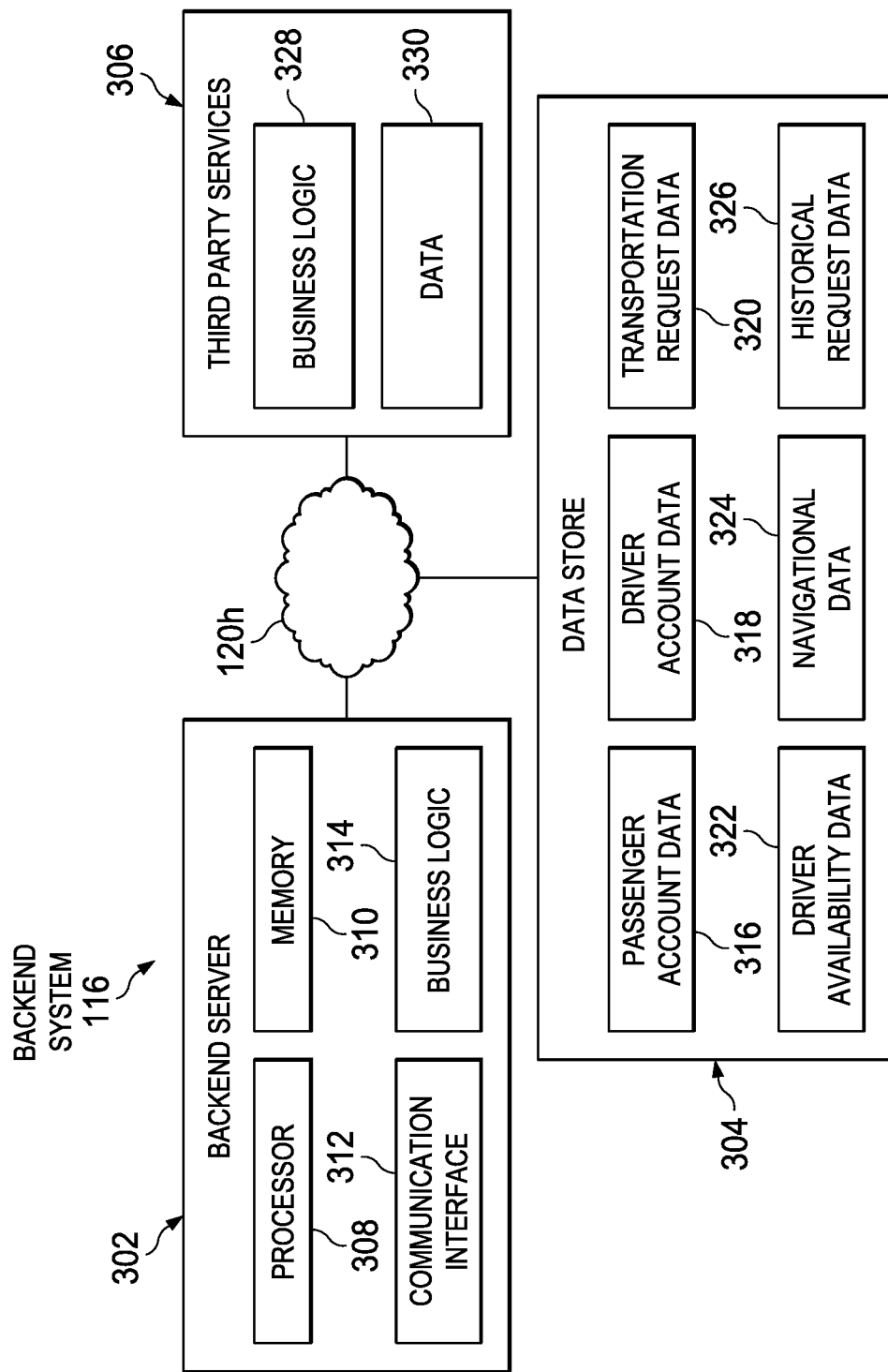
FIG. 3 illustrates a block diagram of a backend system of the system of FIG. 1 in accordance with certain embodiments.

FIG. 3 illustrates a block diagram of a backend system 116 of the system of FIG. 1 in accordance with certain embodiments. Although FIG. 3 depicts a particular implementation of the backend system 116, the backend system may include any suitable devices to facilitate the operation of the transportation service described herein. In the embodiment depicted, backend system includes backend server 302, data store 304, and third party services 306 coupled together by network 120h. In various embodiments, backend server 302, data store 304, and/or third party services 306 may each comprise one or more physical devices (e.g., servers or other computing devices) providing the functionality described herein. In some embodiments, one or more of backend server 302, data store 304, and third party services 306 (or portions thereof) are deployed using a cloud service and may comprise one or more virtual machines or containers.

In the embodiment depicted, backend server 302 includes a computer system to facilitate performance of its operations. As an example, backend server 302 includes one or more processors 308, memory elements 310, and communication interfaces 312, among other hardware and software. These components may work together in order to provide backend server functionality described herein. Processor 308 may have any suitable characteristics of the processors 202 and 204 described above. In particular embodiments, backend server 302 may utilize multiple processors to perform the functions described herein. In various embodiments, reference to a processor may refer to multiple discrete processors communicatively coupled together.

Similarly, memory 310 may have any suitable characteristics of memories 206 and 208 described above. Memory 310 may store any suitable data or information utilized by backend server 302, including software embedded in a computer readable medium, and/or encoded logic incorporated in hardware or otherwise stored (e.g., firmware). Memory 310 may also store the results and/or intermediate results of the various calculations and determinations performed by processor 308.

Communication interface 312 may also have any suitable characteristics of communication interfaces 214 and 216 described above. Communication interfaces 312 may be used for the communication of signaling and/or data between backend server 302 and one or more networks (e.g., networks 120) and/or network nodes (e.g., computing devices 104 and 108, data store 304, third party services 306, and application server 112) coupled to a network or other communication channel.

Business logic 314 may have any suitable characteristics of application logic 218 and 220 described above. Business logic 314 may include logic providing, at least in part, the functionality of the backend server described herein. In a particular embodiment, business logic 314 may include software that is executed by processor 308. However, in other embodiments, business logic 314 may take other forms such as those described above with respect to application logic 218 and 220.

Backend server 302 may communicate with data store 304 to initiate storage and retrieval of data related to the transportation service. Data store 304, may store any suitable data associated with the transportation service in any suitable format(s). For example, data store 304 may include one or more database management systems (DBMS), such as SQL Server, Oracle, Sybase, IBM DB2, or NoSQL data bases (e.g., Redis and MongoDB).

In the embodiment depicted, data store 304 includes passenger account data 316, driver account data 318, transportation request data 320, driver availability data 322, navigational data 324, and historical request data 326. The various data may be updated at any suitable intervals.

Passenger account data 316 may include any suitable information associated with passenger accounts, such as contact information (e.g., real names and addresses), user names and passwords (or other authentication information), payment information (e.g., credit card or bank account numbers and associated information), passenger preferences (e.g., preferred type or color of car), ratings the passenger has given drivers, ratings the passenger has received from drivers, or other information associated with passenger profiles.

Driver account data 318 may include any suitable information associated with driver accounts, such as contact information (e.g., real names and addresses), user names and passwords (or other authentication information), payment collection information (e.g., bank account information), vehicle information (e.g., models and colors of cars the drivers utilize, maximum capacity of the cars of the drivers), merchandise offered by the drivers, whether the drivers are available to transport passengers, whether the drivers have opted for automatic acceptance of transportation requests (whereby the backend server 302 may assign a transportation request to the driver without waiting for the driver to indicate acceptance of a request), or other suitable information.

Transportation request data 320 may comprise pending requests (i.e., requests that have not yet been fulfilled) received from passengers. Each request may include any suitable information, such as any combination of one or more of an identification of the passenger making the request, the time the request was made, the current location of the passenger, the desired pick-up location, the desired pick-up time, the estimated time remaining until a driver can pick up the passenger, the actual pick-up time, the desired destination location of the passenger (which the passenger may or may not provide at the time the request is made), the expected arrival time at the destination location, the type of vehicle requested, estimated fare for the trip, current accumulated fare for the trip, estimated time and mileage remaining in the trip, other information specified by the user (e.g., requested merchandise, requested minimum rating of driver), whether a driver has been assigned to a request, and which driver has been assigned to a request. Entries for a transportation requests specifying a time duration may include any of the information described herein as being associated with such requests, such as a start time, end time, time duration, pickup location, one or more destination locations, one or more wait times, or other suitable information.

Driver availability data 322 may comprise information associated with drivers that are available to transport passengers. In some embodiments, driver availability data 322 may also comprise information associated with drivers that are not available to transport passengers (e.g., because they are off-duty or currently transporting a passenger). An entry in the driver availability data 322 may include an identification of a driver and any suitable associated information, such as one or more of a current location of the driver, whether the driver is available to transport passengers, whether the driver is currently transporting a passenger, a destination location of a current trip of the driver, an estimate of how long it will be before the driver finishes his current trip, whether the driver has opted for automatic acceptance of transportation requests, or other suitable information. Driver availability data 322 may also include any of the information described above that might be used by the backend system 116 in determining which driver(s) to assign to a transportation request specifying a time duration, such as a status of a driver, a preferred work location of a driver, appointments of a driver, shift start and end times, or other suitable information. In various embodiments, driver availability data 322 may store the fuel or electric power level of the vehicle of the driver based on information received from the driver. In a particular embodiment, the fuel or electric power level is sent by driver computing device 108 to backend server 302. For example, driver computing device 108 may be integrated with the vehicle and may periodically sense the fuel or electric power level of the vehicle and transmit this information to backend server 302. As another example, the driver may enter such information into driver computing device 108 which may then transmit it to backend server 302.

Navigational data 324 may comprise information supporting navigation functions provided by the passenger applications and driver passenger applications. For example, navigational data 324 may comprise map data that may be sent to passenger computing devices 104 and driver computing devices 108 to allow the devices to display maps and associated indicators (e.g., location of passenger(s), location of driver(s), desired routes, etc.). In some embodiments, the navigational data may also comprise information indicative of the amount of time required to travel between various locations. In some embodiments, navigational data 324 may comprise historic and/or real time data about the flow of traffic in particular areas enabling backend server 302 to calculate an estimated time required to travel from one location to another.

Historical request data 326 may comprise information about completed requests. In some embodiments, historical request data 326 may also include information about canceled requests. The information for each request may include any combination of the information listed above with respect to requests stored in the transportation request data 320 as well as any combination of additional data such as the time at which the destination location was reached, the total time of the trip, the total fare, a rating given by the passenger to the driver or by the driver to the passenger for the trip, or other suitable information associated with the trip.

In various embodiments, backend server 302 may access third party services 306 through business logic 328 to access data 330. Third party services 306 may represent any suitable number of devices operated by any suitable number of third parties that are distinct from an entity that operates the backend system 116 and/or data store 304. For example, in some embodiments the navigational data may be obtained from a third party service 306 rather than data store 304, or additional third party navigational data such as map data or historical and/or current traffic flow information may be used to supplement navigational data 324. As another example, third party services 306 may authenticate users on behalf of the backend server 302 (e.g., through an account of the user with the third party). Business logic 328 may comprise any suitable logic operable to receive requests for data from backend system 116 and/or computing devices 104 and 108 and provide responses to the requests.

Backend server 302 may be in communication with each passenger computing device 104 and each driver computing device 108 that is utilizing the transportation service at a particular time. Backend server may store information received from the computing devices 104 and 108 in data store 304. Backend server 302 may also receive and respond to requests made by computing devices 104 and 108 by processing information retrieved from data store 304.

When a passenger opens the passenger application, the backend server 302 may log the passenger in based on a comparison of authentication information provided by the passenger computing device 104 with authentication information stored in passenger account data 316. The passenger may then request a ride. The request is received by the backend server 302 and stored in transportation request data 320. Backend server 302 may access driver availability data 322 to determine one or more drivers that would be suitable to fulfill the request from the passenger. In one embodiment, backend server 302 selects a particular driver (e.g., based on the driver's locality with respect to the passenger's pick-up location) and sends information associated with the request to the driver. The driver indicates whether he accepts or rejects the request via his computing device 108. If the driver rejects the request, backend server 302 selects a different driver and the process is repeated until the backend server 302 receives an accepted request from a driver. In another embodiment, backend server 302 may select a plurality of drivers that may fulfill a transportation request and allow the passenger to select one of the drivers. The backend server 302 may proceed to notify the driver of the request in a similar manner to that described above. In yet another embodiment, backend server 302 may select a plurality of drivers that may fulfill a transportation request and notify each driver of the transportation request. The backend server 302 may then allocate the request to one of the drivers based on any suitable criteria. For example, the driver who is the first to accept the request may be assigned to the request. As another example, if multiple drivers accept the request within a given timeframe, the request may be assigned to the most suitable driver (e.g., the driver that is closest to the pick-up location or a driver that has a car that meets preferred characteristics of the transportation request).

Once the request has been accepted by a driver, the backend server 302 notifies the passenger that a driver has accepted his request and provides any suitable information associated with the driver (e.g., driver's current location, model and color of vehicle, estimated time of arrival, etc.) to the passenger.

The backend server 302 may provide navigation information (e.g., the passenger's current location or other pickup location and directions to the current location or other pickup location) to the driver computing device 108 to direct the driver to the passenger's pickup location and subsequently to direct the driver to the passenger's destination location. The backend server 302 may also provide real-time updates associated with the trip to both the passenger and the driver.

Once the passenger's destination location has been reached, the backend server 302 may facilitate payment of the fare for the trip using payment information stored in passenger account data 316 and/or driver account data 318 (or information supplied by the passenger at the time of the transaction). The backend server 302 may also receive ratings associated with the trip for the passenger and driver and store these ratings in data store 304.

In various embodiments, backend server 302 may receive a transportation request specifying a duration of time from a passenger computing device. As described above, the transportation request may include other information, such as a start time and a pickup location. In various embodiments, the backend server 302 may modify the request if the specified conditions cannot be met and return the modified request to the passenger for approval.

Backend server 302 may select one or more drivers for the transportation request in any suitable manner and based upon any suitable data (such as any of the data described above used to select a driver for a standard request). In various embodiments, backend server 302 may take into account the start time, end time, time duration, pickup location, intermediate destination locations, final destination location, or other information associated with the request. In particular embodiments, backend server 302 may also take into account any suitable combination of information associated with drivers, such as current or future projected availability status (as well as exception criteria in some instances), current location, projected location (i.e., a location at which a driver is expected to be at a future time based on historical data or explicit indications from the driver), shift start time, shift end time, scheduled appointments or breaks, preferred work locations, preference levels for transportation requests specifying time durations, driver ratings, or other suitable information associated with the drivers. In various embodiments, such information may be explicitly specified by the driver or inferred based on historical data tracked by backend server 302. In particular embodiments, the selection of the one or more drivers is based, at least in part, on a current fuel or power level or capacity. In particular embodiments, the selection may take into account a distance the driver may travel using the current or maximum fuel or power level of the vehicle). For example, a single driver may be selected based on a determination that the driver may service the entirety of the request without refueling or charging. As another example, a single driver may be selected based on a determination that the driver may service the entirety of the request because (even though the current or maximum fuel or power level of the vehicle may not be enough to service the entire request) the driver will be able to refuel or recharge during one of the scheduled stops in the transportation request without interrupting the request of the passenger.

If the backend server 302 determines that a single driver is unavailable to service the entire transportation request, it may select one or more additional drivers to help with the request and may assign portions of the request to each driver. Such a determination may be made at the time of the initial transportation request or in response to an update to the original request (e.g., a passenger may extend the time duration during the ride).

In various embodiments, backend server 302 may also determine a price for the transportation request based upon any combination of one or more criteria, such as the criteria described above used to select the drivers (e.g., the duration of the request, the estimated distance to be traveled during fulfillment of the request) or other suitable criteria (e.g., the general availability of drivers during the time duration of the request, how much distance will be covered if destination locations are specified in the request, the type of car requested, etc.). The price may be relayed to the passenger via the passenger computing device 104.

The backend server 302 may notify the drivers they have been selected for a transportation request specifying a time duration in any suitable manner. In one example, the backend server 302 selects a driver and notifies the driver of the assignments. In another embodiment, the backend server 302 selects a driver and queries the driver as to whether the driver accepts the assignment. In some embodiments, a driver may respond with a partial acceptance of the assignment. For example, the driver may respond that he would only be available to service a particular portion of the transportation request. For instance, the driver may indicate that he is available for the first two hours of the request or for the last three hours of the request. In response, the backend server 302 may attempt to find a different driver to accept the entirety of the request or to fulfill the portion of the request that the first driver is unable to fulfill. In some embodiments, the backend server 302 may determine from information stored in data store 304 that a particular driver may be unable to service an entire transportation request and may select one or more additional drivers and notify all drivers simultaneously of their selection. In other embodiments, the backend server 302 may notify the drivers sequentially from the first driver to the last driver. This embodiment has the advantage of allowing the backend server 302 to adjust the start and/or end times for the subsequent drivers if an earlier driver is unable to fulfill the entire slot allotted by the backend server 302.

Once the backend server 302 assigns one or more drivers to the transportation request, the backend server 302 may notify the passenger (e.g., via passenger computing device 104) that the request is confirmed and may provide any suitable information about the request, such as contact information of the driver(s), identifying information about the drivers or vehicles, information about driver handoffs (if any), or other suitable details regarding the transportation request and/or one or more drivers that will fulfill the transportation request.

Prior to the start time of the transportation request, backend system 116 may send navigational data to a driver to allow the driver to pick up the passenger at the specified pickup location at the specified start time. Backend system 116 may also send navigational data to guide the driver to any destination locations that the transport request specifies (or that the passenger specifies during the ride). Backend system 116 may also send navigational data to guide the driver to a handoff location if the driver is to hand off the passenger to another driver. Furthermore, backend system 116 might send the driver the location of a driver to which he is to hand off the passenger in order to facilitate a smooth handoff.

After the initial request is received (e.g., before the ride begins or sometime during the ride), backend server 302 may receive a request from a passenger computing device 104 (or from a driver computing device 108 on behalf of the passenger) to change the duration of the ride.

Backend server 302 may notify driver computing device 108 of the change. If the request specifies a longer duration, the driver may be notified of the request to extend the duration and may be given an opportunity to accept or reject servicing the additional time (and an additional driver may be found if he rejects the extension). In particular embodiments, backend server 302 may automatically determine (e.g., without intervention by the driver at the time of the change) based on information included in data store 304 (e.g., driver availability data 322 or other information associated with the driver) whether a driver that is servicing the last portion of the transportation request is available to service the request through the end of the extended duration of time specified in the update. In a particular embodiment, the determination of whether the driver is available to complete the entirety of the request is based on a distance between a current or projected future location of the driver (e.g., a location at which the driver will be at as a result of the transportation request) and another location associated with the driver. For example, the other location associated with the driver may be a location at which the driver is to pick up another passenger or to attend an appointment, an assigned or preferred work location associated with the driver (to ensure that the driver doesn't get too far from this location), or other suitable location. In various embodiments, the determination of whether the driver is available to complete the entirety of the request is based on an appointment or other scheduled ride of the driver. For example, if the extension would result in the driver not being able to arrive to the appointment or pick up a passenger on time, another driver may be procured. In various embodiments, the determination of whether the driver is available to complete the entirety of the request is based on a current or projected fuel level or battery power level of the vehicle (which may be referred to as a driver in the case of a self-driven car). When the driver comprises a self-driven vehicle, the fuel measurements or battery power measurements may be periodically reported from the driver to backend system 102 for use in such determinations.

In particular embodiments, if a determination is made that a driver is unable to complete the entirety of the extended duration, a determination may be made that the driver may complete a portion of the extended duration and set a handoff time accordingly. The backend server 302 may choose the handoff time based on any suitable factors, such as the availability of the driver (e.g., the backend server may determine a time that the driver should end such that the driver may make his appointment or ride on time), the availability of the driver to which the passenger will be handed off to, the projected locations of either driver (e.g., a destination location specified by the passenger in order to minimize disruption to the passenger), or other suitable information.

If a determination that the driver can service the transportation request through the extended duration is made, the request may be granted. If the driver is unavailable to service the request for the extended duration, the backend server 302 may attempt to arrange for another driver to which the passenger may be handed off. If an additional driver cannot be found, the request may be denied or partially granted (up to the time that the driver is no longer available) and the passenger may be notified that the driver is only able to fulfill a portion of the extended duration.

In particular embodiments, a handoff may be arranged in response to a determination that a handoff is needed independent of an updated request from a passenger. For example, a handoff may be initiated in response to a determination that a driver has moved (or will move due to the transportation request) outside of an assigned area or too far from a particular location (e.g., a preferred work location specified by the driver). As another example, a handoff may be arranged in response to a request from the driver to initiate a handoff. As another example, a handoff may be arranged in response to a determination that the driver will not be able to arrive on time to an appointment or a scheduled ride unless a handoff is performed. As yet another example, a handoff may be arranged in response to a detection that a vehicle servicing the transportation request has a fuel level or a battery power level below a particular threshold (or is estimated to reach the threshold in the near future as a result of the transportation request).

During the servicing of the request, if a handoff is needed, backend server 302 may facilitate a smooth transition of the passenger from a first driver to a second driver. For example, backend server 302 may select the time and/or location of the handoff so as to minimize the disruption to the passenger. For example, backend server 302 may schedule the handoff to take place during a scheduled stop of the transportation request at the location of the stop. As another example, backend server 302 may schedule the handoff to take place at a location that is convenient (e.g., based on the locations position relative to a highway or other road) to the passenger if the handoff is to take place while the passenger is en route to a location.

The backend server 302 may send any of the parties (e.g., either driver or the passenger) information associated with the handoff, such as the location of the handoff, the time of the handoff, navigational information to the handoff location, identification of the vehicles or drivers involved in the handoff, the current location of either driver or the passenger, or other suitable information associated with the handoff. Such information may be communicated to the parties at any suitable time and any number of times. For example, the information may be sent once the terms of the handoff have been decided by backend server 302. As another example, information associated with the handoff may be sent to either driver when they need to begin driving towards the handoff location. As another example, a notification that the handoff has occurred may be sent to the passenger when the handoff occurs. Accordingly, if the passenger is away from the vehicle during the handoff, the passenger is made aware of the vehicle and/or driver to which the passenger should return to resume the trip. In a particular embodiment, when a handoff occurs the backend server and/or the driver computing device 108 may prompt either or both drivers to transfer luggage from the first vehicle to the second vehicle and/or may ask for a confirmation from the driver(s) that the luggage has been transferred. In some embodiments, the prompt may be initiated by the backend server 302 sending a message to one or more of the driver computing devices 108. In some embodiments, backend server 302 may track whether the vehicle is storing luggage and only send such promptings if the vehicle is storing luggage. In a case where both vehicles are self-driven, backend server 302 may prompt the passenger at an appropriate time before the handoff occurs to move all personal items from the first vehicle to the second vehicle and/or wait from a confirmation from the passenger before the first vehicle is driven away from the passenger.

Figure 4:
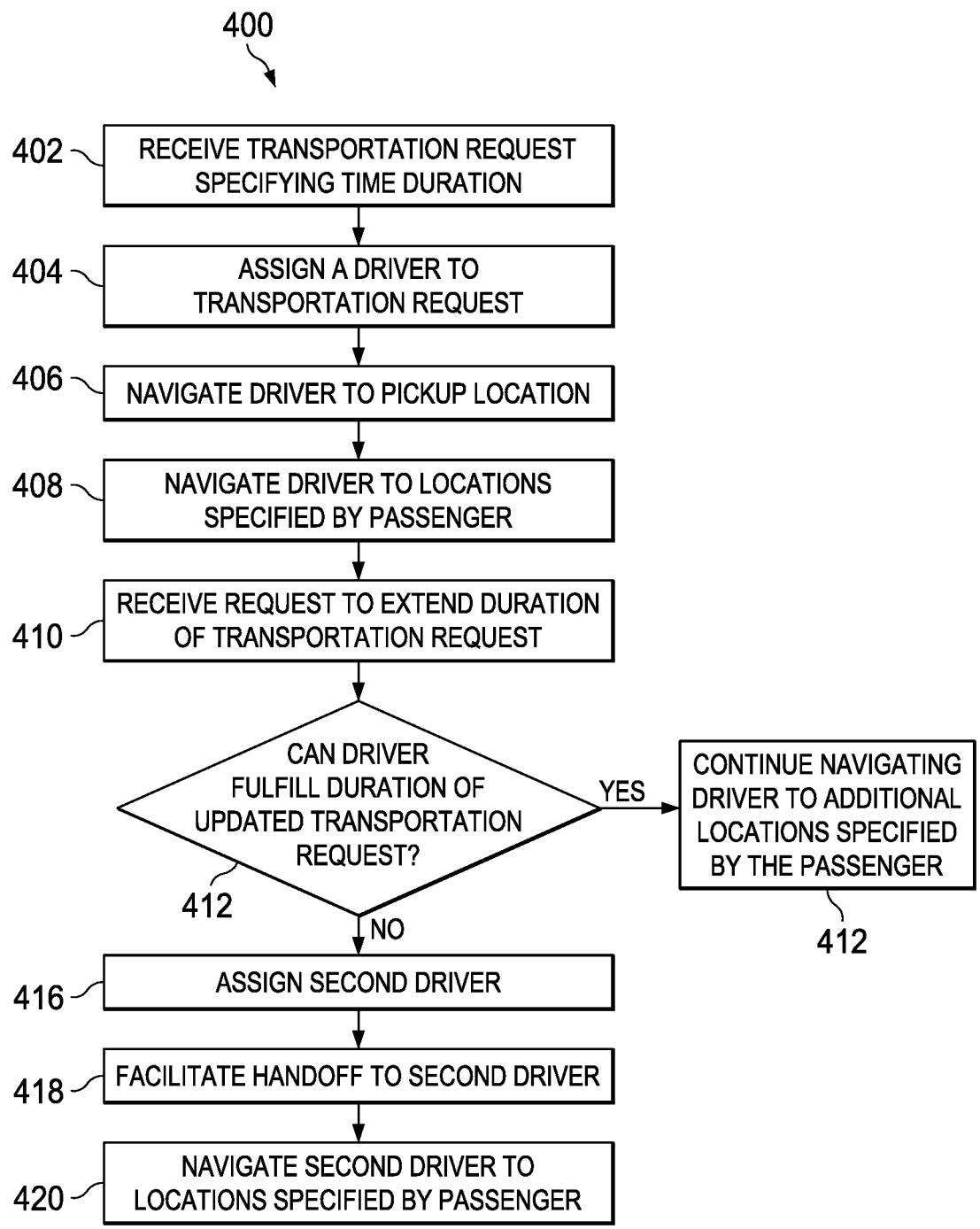
FIG. 4 illustrates a method for selecting drivers for transportation requests with specified time durations in accordance with certain embodiments.

FIG. 4 illustrates a method 400 for selecting drivers for transportation requests with specified time durations in accordance with certain embodiments. The steps of FIG. 4 may be performed, for example, by backend system 116. At step 402, a transportation request specifying a time duration is received. For example, the request may be received from a passenger computing device 104. At step 404, a driver is assigned to fulfill the transportation request. The driver may be selected based on any suitable criteria such as that described above. At step 406, the driver is navigated to a pickup location specified in the transportation request to pick up the passenger. At step 408, the driver is navigated to locations specified by the passenger. At any time, if backend system 116 determines that a handoff should be performed, an additional driver may be procured and the handoff facilitated.

At step 410, a request is received from the passenger to extend the duration of the transportation request. At step 412 it is determined whether the driver can fulfill the duration of the updated transportation request. If the driver can fulfill the duration of the updated transportation request, then the backend system 116 continues navigating the driver to additional locations specified by the passenger until the end time of the updated transportation request at step 414. If the driver cannot fulfill the duration of the updated transportation request, a second driver is assigned at step 416. Backend system 116 then facilitates handoff of the passenger to the second driver at the appropriate time. The facilitation may include selecting a location and a time for the handoff and notifying the parties of details associated with the handoff. At step 420, after the handoff has occurred, the second driver is navigated to locations specified by the passenger until the entirety of the transportation request has been fulfilled.

Some of the steps illustrated in FIG. 4 may be repeated, combined, modified or deleted where appropriate, and additional steps may also be included. Additionally, steps may be performed in any suitable order or concurrently without departing from the scope of particular embodiments.

It is also important to note that the steps in FIG. 4 illustrate only some of the possible scenarios that may be executed by, or within, the various components of the system described herein. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion.

The functionality described herein may also be performed by any suitable component of the system. For example, certain functionality described herein as being performed by backend server 116, may, in various embodiments, be performed by any combination of one or more passenger computing devices 104 or driver computing devices 108 where appropriate. Similarly, certain functionality described herein as being performed by a passenger computing device 104 or a driver computing device 108 may, in various embodiments, be performed by backend server 116 where appropriate.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
receiving, by a processing device of a server from a passenger computing device, a transportation request corresponding to a specified duration of time;
selecting, from a plurality of driver computing devices based on the specified duration of time corresponding to the transportation request, a first driver computing device associated with a first vehicle to pick up a passenger associated with the passenger computing device at a pickup location;
determining, after the first vehicle picks up the passenger at the pickup location, that the first vehicle is unable to complete the transportation request;
receiving, by the processing device from the first driver computing device, a real-time location of the first vehicle based on position data according to a global positioning system of the first driver computing device;
determining real-time locations of the plurality of driver computing devices based on additional position data according to respective global positioning systems of the plurality of driver computing devices,
in response to determining that the first vehicle is unable to complete the transportation request, determining, based on each of the real-time location of the first driver computing device, a remaining duration of time from the specified duration of time, and the real-time locations of the plurality of driver computing devices:
a handoff location that differs from each of the pickup location, the real-time location of the first driver computing device, and the real-time locations of the plurality of driver computing devices, and
a second driver computing device associated with a second vehicle, from the plurality of driver computing devices, to complete a remainder of the transportation request beginning from the handoff location; and
providing, by the processing device to the first driver computing device and the second driver computing device, real-time navigational data to control respective presentations of navigational instructions on the first driver computing device and the second driver computing device as the first driver computing device and the second driver computing device navigate the respective first and second vehicles to the handoff location in accordance with the navigational instructions.

2. The method of claim 1, wherein:
  determining the handoff location comprises determining a location along a route corresponding to the transportation request; and
  determining the second vehicle is to complete the remainder of the transportation request is further based on a real-time location of the second driver computing device relative to the location along the route.

3. The method of claim 2, further comprising determining a handoff time based on the handoff location, the real-time location of the first driver computing device relative to the handoff location, and the real-time location of the second driver computing device relative to the handoff location; and
  providing, to the passenger computing device, a notification comprising the handoff time.

4. The method of claim 2, wherein determining the second driver computing device is further based on a current or future availability status associated with the second driver computing device.

5. The method of claim 2, wherein the first vehicle is a first self-driven vehicle and a second vehicle associated with the second driver computing device is a second self-driven vehicle.

6. The method of claim 1, further comprising:
  receiving an updated transportation request from the passenger computing device to extend the specified duration of time of the transportation request, the updated transportation request being associated with an extended duration of time; and
  determining, based on the extended duration of time and information stored in a data record associated with the first driver computing device, whether the first driver is available through an end of the extended duration of time to fulfill the updated transportation request.

7. The method of claim 6, further comprising:
  determining that the first driver is unavailable to fulfill the updated transportation request through the end of the extended duration of time; and
  selecting the second driver to pick up the passenger to fulfill the updated transportation request through the end of the extended duration of time.

8. The method of claim 1, further comprising providing a notification to the passenger computing device that the first vehicle is unable to complete the transportation request and comprising information regarding the second driver computing device.

9. The method of claim 8, wherein the notification further comprises information regarding at least one of the handoff location or the first driver computing device.

10. The method of claim 1, wherein determining the second vehicle is to complete the remainder of the transportation request is further based on receiving an indication of confirmation from the second driver computing device.

11. The method of claim 1, wherein selecting the first vehicle is further based on a working end time corresponding to the first driver computing device.

12. The method of claim 1, wherein determining that the first vehicle is unable to complete the transportation request is in response to the real-time location of the first driver computing device moving outside of a geographic area associated with the first driver computing device.

13. The method of claim 1, wherein determining that the first vehicle is unable to complete the transportation request is based on a distance between a current or projected future location of the first driver computing device associated with the transportation request and a scheduled destination location.

14. The method of claim 1, wherein determining that the first vehicle is unable to complete the transportation request is based on received user input corresponding to the first driver computing device.

15. The method of claim 1, wherein:
  the first vehicle is a self-driven vehicle; and
  determining that the first vehicle is unable to complete the transportation request is based on an amount of fuel or battery power of the self-driven vehicle.

16. The method of claim 1, wherein the first vehicle is a self-driven vehicle and the selecting of the first driver computing device associated with the first vehicle to pick up the passenger is based on a determination that the self-driven vehicle includes sufficient battery power to fulfill the transportation request for the specified duration of time.

17. A system comprising:
  at least one processor; and
  a non-transitory computer readable medium comprising instructions that, when executed by the at least one processor, cause the system to:
    receive, from a passenger computing device associated with a passenger, a transportation request corresponding to a specified duration of time;
    select, from a plurality of driver computing devices based on the specified duration of time corresponding to the transportation request, a first driver computing device associated with a first vehicle to pick up the passenger at a pickup location;
    determine, after the first vehicle picks up the passenger at the pickup location, that the first vehicle is unable to complete the transportation request;
    receive, from the first driver computing device, a real-time location of the first vehicle based on position data according to a global positioning system of the first driver computing device;
    determine real-time locations of the plurality of driver computing devices based on additional position data according to respective global positioning systems of the plurality of driver computing devices,
    in response to determining that the first vehicle is unable to complete the transportation request, determine based on each of the real-time location of the first driver computing device, a remaining duration of time from the specified duration of time, and the real-time locations of the plurality of driver computing devices:
      a handoff location that differs from each of the pickup location, the real-time location of the first driver computing device, and the real-time locations of the plurality of driver computing devices, and
      a second driver computing device associated with a second vehicle, from the plurality of driver computing devices, to complete a remainder of the transportation request beginning from the handoff location; and
    provide, to the first driver computing device and the second driver computing device, real-time navigational data to control respective presentations of navigational instructions on the first driver computing device and the second driver computing device as the first driver computing device and the second driver computing device navigate the respective first and second vehicles to the handoff location in accordance with the navigational instructions.

18. The system of claim 17, further comprising instructions that, when executed by the at least one processor, cause the system to:
- receive an updated transportation request from the passenger computing device to extend the specified duration of time of the transportation request, the updated transportation request being associated with an extended duration of time; and
- determine, based on the extended duration of time and information stored in a data record associated with the first driver computing device, whether the first driver is available through an end of the extended duration of time to fulfill the updated transportation request.

19. At least one computer-readable non-transitory media storing one or more instructions which, when executed by a processing device, cause the processing device to:
- receive, from a passenger computing device, a transportation request corresponding to a specified duration of time;
- select, from a plurality of driver computing devices based on the specified duration of time corresponding to the transportation request, a first driver computing device associated with a first vehicle to pick up a passenger associated with the passenger computing device at a pickup location;
- determine, after the first vehicle picks up the passenger at the pickup location, that the first vehicle is unable to complete the transportation request;
- receive, from the first driver computing device, a real-time location of the first vehicle based on position data according to a global positioning system of the first driver computing device;
- determine real-time locations of the plurality of driver computing devices based on additional position data according to respective global positioning systems of the plurality of driver computing devices,
- in response to determining that the first vehicle is unable to complete the transportation request, determine, based on each of the real-time location of the first driver computing device, a remaining duration of time from the specified duration of time, and the real-time locations of the plurality of driver computing devices:
  - a handoff location that differs from each of the pickup location, the real-time location of the first driver computing device, and the real-time locations of the plurality of driver computing devices, and
  - a second driver computing device associated with a second vehicle, from the plurality of driver computing devices, to complete a remainder of the transportation request beginning from the handoff location; and
- provide, to the first driver computing device and the second driver computing device, real-time navigational data to control respective presentations of navigational instructions on the first driver computing device and the second driver computing device as the first driver computing device and the second driver computing device navigate the respective first and second vehicles to the handoff location in accordance with the navigational instructions.

20. The at least one computer-readable non-transitory media of claim 19, further comprising instructions that, when executed by the processing device, cause the processing device to:
- determine the handoff location by determining a location along a route corresponding to the transportation request; and
- determine the second vehicle is to complete the remainder of the transportation request is further based on the real-time location of the second driver computing device relative to the location along the route.

* * * * *